United States Patent [19]
Farley

[11] Patent Number: 6,033,510
[45] Date of Patent: Mar. 7, 2000

[54] METHOD FOR FABRICATING COMPOSITE STRUCTURES USING PULTRUSION PROCESSING

[75] Inventor: Gary L. Farley, Yorktown, Va.

[73] Assignee: The United States of America as represented by the United States National Aeronautics and Space Administration, Washington, D.C.

[21] Appl. No.: 08/933,735

[22] Filed: Sep. 23, 1997

Related U.S. Application Data

[62] Division of application No. 08/511,568, Aug. 4, 1995, Pat. No. 5,681,513.

[51] Int. Cl.$^7$ ................................................ B29C 70/52
[52] U.S. Cl. ........................... 156/180; 156/80; 156/166; 156/275.5; 264/137
[58] Field of Search .................................. 156/166, 180, 156/433, 441, 80, 275.5; 264/137

[56] References Cited

U.S. PATENT DOCUMENTS

| | | | |
|---|---|---|---|
| 3,654,028 | 4/1972 | Goldsworthy | 156/180 X |
| 4,591,400 | 5/1986 | Fradenburgh et al. | 156/80 |
| 4,803,819 | 2/1989 | Kelsey . | |
| 4,842,667 | 6/1989 | Thorsted, Jr. | 156/180 X |
| 5,556,496 | 9/1996 | Sumerak | 156/166 |

FOREIGN PATENT DOCUMENTS

| | | | |
|---|---|---|---|
| 290849 | 11/1987 | European Pat. Off. . | |
| 1206946 | 9/1970 | United Kingdom | 156/180 |
| 1546764 | 5/1979 | United Kingdom | 156/180 |

OTHER PUBLICATIONS

Epstein, et al, "Composites and textile reinforcement," Report sponsored by Technology Devel. Ctr., Finland, and Technical Research Centre of Finland, abstract only, Dec. 1992.

Primary Examiner—Jeff H. Aftergut
Attorney, Agent, or Firm—Robin W. Edwards

[57] ABSTRACT

A method for fabricating composite structures at a low-cost, moderate-to-high production rate. A first embodiment of the method includes employing a continuous press forming fabrication process. A second embodiment of the method includes employing a pultrusion process for obtaining composite structures. The methods include coating yarns with matrix material, weaving the yarn into fabric to produce a continuous fabric supply and feeding multiple layers of net-shaped fabrics having optimally oriented fibers into a debulking tool to form an undebulked preform. The continuous press forming fabrication process includes partially debulking the preform, cutting the partially debulked preform and debulking the partially debulked preform to form a netshape. An electron-beam or similar technique then cures the structure. The pultrusion fabric process includes feeding the undebulked preform into a heated die and gradually debulking the undebulked preform. The undebulked preform in the heated die changes dimension until a desired cross-sectional dimension is achieved. This process further includes obtaining a net-shaped infiltrated uncured preform, cutting the uncured preform to a desired length and electron-beam curing (or similar technique) the uncured preform. These fabrication methods produce superior structures formed at higher production rates, resulting in lower cost and high structural performance.

2 Claims, 2 Drawing Sheets

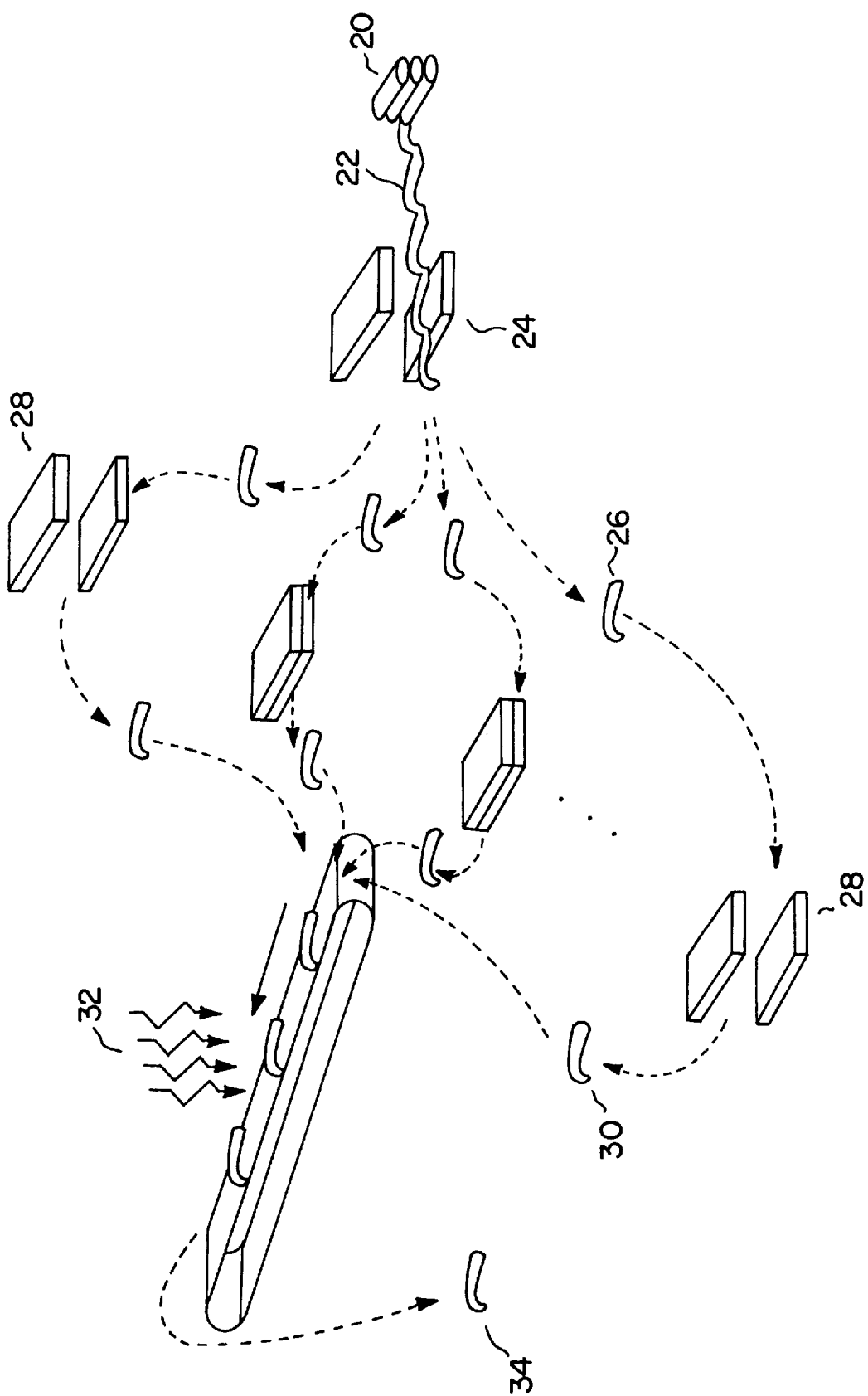

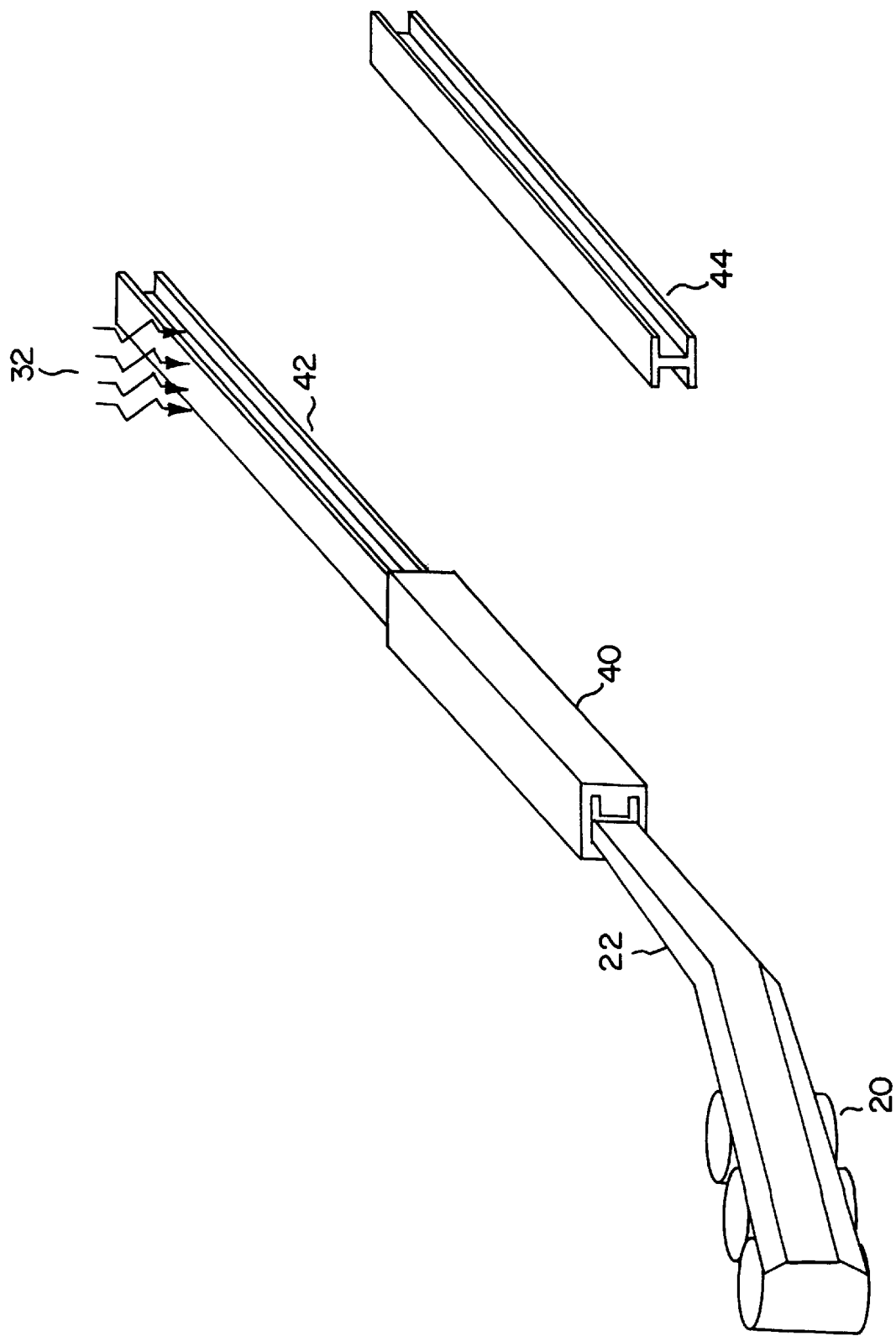

METHOD FOR FABRICATING COMPOSITE STRUCTURES USING PULTRUSION PROCESSING

This is a divisional of application Ser. No. 08/511,568 filed on Aug. 4. 1995, now U.S. Pat. No. 5,681,513.

ORIGIN OF THE INVENTION

The invention described herein was made by an employee of the U.S. Government and may be used by or for the government for governmental purposes without the payment of royalties thereon or therefor.

BACKGROUND OF THE INVENTION

1. Field of the Invention

The present invention is directed to a method for fabricating composite structures. Particularly, the present invention relates to a method for forming composite primary and secondary structures employing a continuous net-shape material supply in a continuous press forming process and a pultrusion fabrication process at a low-cost, moderate-to-high production rate.

2. Description of the Related Art

There are numerous methods for the fabrication of composite structures, including, but not limited to, thermoforming polymeric matrices and autoclave processing. However, all are either labor intensive, more costly than using purely metallic materials, not applicable to moderate-to-high volume applications, or do not result in high structurally-efficient structures. The prior art processes are generally batch oriented, such as those employed for autoclave cured structures.

Fabrication of complex non-uniform structural members is a labor intensive process typically consisting of cutting and darting fabric to facilitate the conformance of planar materials to non-planar geometries. The cost of the resulting structures is high, requires considerable time to produce and the process is prone to errors. Even utilizing automated material placement systems which are known in the art, such as advanced tow placement, the time required to produce a structure, the cost and the part quality is less than optimal.

There are pultrusion processing methods known in the art in which heat-cured, pultruded, composite structures can be produced at moderate-to-high production rates. However, in these processing methods a resin system is employed that sacrifices structural performance for rapid processing. Furthermore, conventional pultruded structures are generally unsuitable for primary structural applications due to their less than optimal structural performance. Lower structural performance is due to non-optimal fiber orientations in the fabric and the necessity of using rapid curing resins that have non-optimal structural performance.

SUMMARY OF THE INVENTION

It is an object of the present invention to employ a continuous compression fabrication process for creating low-cost structurally-efficient composite structures.

It is another object of the present invention to employ a continuous pultrusion fabrication process for creating low-cost structurally-efficient composite structures.

It is yet another object of the present invention to employ a composite fabrication process using a continuous supply of net-shaped fabric having optimally tailored fiber orientations.

It is a still further object of the present invention to employ a composite fabrication process using powder coatable resins for eliminating the need for a liquid molding process and its associated costs.

Objects of the present invention are achieved by a method for fabricating composite structures having non-uniform geometry comprising the steps of coating structural yarn with matrix material (e.g., a powder coatable resin or any process that bonds matrix material to the structural yarns); weaving fabric from the structural yarns into a net-shaped structure having optimally tailored fiber orientations into a continuous supply of fabric, that is, one structural shape successively attached to another, forming multiple rolls of fabric; drawing multiple layers of a first series of fabric through rollers and guides; assembling the layers of fabric into an undebulked preform; partially debulking the preform using a partial debulking tool; drawing the partially debulked preform from the debulking tool and advancing a next series of fabric into the partial debulking tool; cutting the partially debulked preform from the continuous supply of fabric; feeding the partially debulked preform to multiple netshaped debulking tools; debulking the partially debulked preform to netshape by uniformly and continuously infiltrating the matrix material into the preform and solidifying the matrix material by removing heat from the process while the net-shaped infiltrated preform is in the net-shaped debulking tools; and curing the matrix material.

The subsequent processing of the net-shaped preform is dependent upon the formulation of the resin used to create the composite structure. For example, matrix material (resin) can be formulated to be solid or liquid at ambient temperatures and cured by heat, electron-beam, ultraviolet (UV) light or by a combination of these curing techniques.

Objects of the present invention are also achieved by a method for fabricating composite structures having uniform geometry comprising the steps of coating structural yarn with matrix material; weaving fabric from the structural yarns into a net-shaped fabric having optimally tailored fiber orientations into a continuous supply of fabric, one part being connected to another part, producing multiple rolls of fabric; feeding multiple layers of fabric to form an undebulked preform; feeding the undebulked preform into a heated die; gradually changing dimension of the heated die to debulk the preform to net-shape until the desired cross-sectional dimension is obtained; pulling the debulked preform through the heated die to infiltrate the matrix material into the net-shaped preform; removing heat from the matrix material allowing it to solidify as the net-shaped infiltrated preform traverses a constant cross-sectional portion of the die; cutting a desired length of the uncured net-shaped infiltrated preform; and curing the net-shaped infiltrated preform. The net-shaped preform can have any desired shape such as an I beam, etc.

The curing of the composite structure is a function of the matrix material's formulation, that is, whether the resin is a liquid or solid at ambient temperatures, and by which technique it is cured (heat, electron-beam, UV or a combination).

The above methods according to the present invention are applicable to moderate-to-high production rate fabrication environments. The resulting structures will be fabricated at a significant cost savings without loss of structural performance as compared to similar structures fabricated using conventional processes. It will be obvious to one of skill in the art how these methods can be modified to accommodate liquid molding techniques (i.e., resin transfer molding) and alternative curing techniques (i.e., heat and ultraviolet light).

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout. For example, with slight modifications to the subsequently described methods it is possible to also use matrix materials that are compatible with conventional liquid molding techniques (i.e., resin transfer molding) and resins that are curable with the application of heat or ultraviolet (UV) light or a combination of heat and electron-beam, heat and UV, and UV and electron-beam.

BRIEF DESCRIPTION OF THE DRAWINGS

FIG. 1 is a diagram of a first embodiment of a method according to the present invention for forming a moderate-to-high volume primary composite structure; and FIG. 2 is a diagram of a second embodiment of a method according to the present invention for pultruding a moderate-to-high volume primary composite structure.

DESCRIPTION OF THE PREFERRED EMBODIMENTS

The methods or processes, according to the preferred embodiments of the present invention shown in FIGS. 1 and 2, employ structural yarns coated with either thermoset or thermoplastic matrix material prior to the weaving of a continuous net-shaped fabric. The weaving of the continuous net-shaped fabric is described in U.S. Pat. No. 5,394,906, issued on Mar. 7, 1995, incorporated by reference herein. The preferred embodiments of the present invention employ the continuous net-shaped material supply in a continuous press forming process or a pultrusion fabrication process.

The yarn coating process step can be any one of several commercially available processes, such as powder coating, sleeve coating, etc. Coated yarns are compatible with conventional particle toughening techniques, such as rubber or thermoplastic toughening techniques, to tailor the degree of damage tolerance in the structure. Resin transfer molding and similar resin infiltration methods preclude the utilization of particle toughened matrices because the preform acts as a filter and prohibits infiltration of the toughening particles into the interior of the preform.

Embodiments of the present invention can also employ the resin transfer molding process to infiltrate resin into a preform. The present invention does not exclude the utilization of state-of-the-art damage tolerant matrices because the resins are coated in the yarn prior to weaving and are not infiltrated into the preform.

The first embodiment of the method of the present invention is shown in FIG. 1. FIG. 1 shows a continuous press forming process for the fabrication of structures having irregular geometries. The process starts by coating structural yarns with matrix material and weaving fabric from the structural yarns into a net-shaped structure having optimal fiber orientations into a continuous supply of multiple rolls of fabric 20 to form a preform as taught in U.S. Pat. No. 5,934,906. Multiple layers of fabric 20 are drawn through a series of rollers and guides (not shown) to assemble the individual layers of fabric into an undebulked preform 22.

After assembling the fabric 20 into the undebulked preform 22, it is drawn into a partial debulking tool 24 which takes the air out from between the layers of fabric and presses the layers of fabric 20 together. Due to the magnitude of the loft in the fabric 20, a single step debulking operation to the net-shaped part is generally unachievable for moderate to thick structures. A two step conventional process is required. If the structure is thin, this initial debulking may not be necessary.

The debulking process includes closing a heated partial debulking tool 24 onto the undebulked preform 22. This compresses the fabric and reduces the loft. This is a rapid process requiring low temperatures and pressures. Typical debulking times are on the order of less than one minute. The partial debulking tool 24 is usually inexpensive because of the low temperature and pressure requirements.

After the undebulked preform 22 is partially debulked, it is drawn out of the partial debulking tool 24 and cut from the continuous supply of fabric 20 to form a partially debulked preform 26. As the partially debulked preform 26 is drawn from the partial debulking tool 24, a next series of fabric 20 is advanced into the partial debulking tool 24 where the debulking process is repeated. The cut partially debulked preform 26 is placed into one of many net-shaped debulking tools 28 where the preform 26 is debulked to net-shape. Sufficient heat and pressure are applied to the partially debulked preform 26 so that the matrix material in the fabric 20 melts and flows. The flowing of the matrix material facilitates the debulking process so that the partially debulked preform 26 can be formed to net shape and the matrix material is uniformly and continuously dispersed within the preform 26. Heat is then removed from the process allowing the matrix material to solidify. The time required in the net-shaped debulking process is dependent on the type of matrix material employed. Processing time is on the order of five to ten times longer than the initial partial debulking operation. Because of the difference in times between the partial debulking and the net-shaped debulking operations a single partial debulking tool 24 can feed multiple net-shaped debulking tools 28.

Once the matrix material has completely solidified, an uncured structural part 30 can be removed from the debulking tool 28 without deforming. That is, the uncured structural part 30 retains its shape without support from the debulking tool 28.

The net-shaped debulking tools 28 are subject to moderate pressures and temperatures during the debulking to net-shape process. However, the debulking tools 28 are inexpensive relative to those used in conventional autoclave processes.

After the uncured structural part 30 has been debulked to net-shape and removed from the debulking tool 28, it is placed into an electron-beam chamber 32 where it is cured and is output as a cured structure 34. The uncured structural part 30 is free-standing. That is, no tooling is required for the uncured structure part 30 to maintain its shape during the electron-beam curing process. The amount of time required to cure the uncured structural part 30 employing an electron-beam is a function of part size, thickness and complexity. Cure times are on the order of, for example, approximately seconds to several minutes as compared to multiple hours for typical autoclave cures. The electron-beam curing process eliminates the time and costs associated with autoclave cure. Furthermore, the heat curing of matrix material can create chemical reactions that result in the formation of undesirable voids and anomalies in the interior of the composite structure. If the voids or anomalies are large enough, then the structural performance of the part suffers and the structure may not be serviceable. The use of an electron-beam as in the preferred embodiment of the present invention does not cause chemical reactions that can result in the formation of voids. Furthermore, electron-beam curing of matrix material can be performed at any desired temperature which virtually eliminates residual thermal stresses. Electron-beam curing also allows the curing of asymmetric laminates without causing significant warpage caused by residual thermal stresses.

An all heat cure can also be employed in the aforementioned fabrication process, but the advantages will not be as great as using an electron-beam cure. In addition, the continuous supply of net-shaped fabric facilitates the automated continuous process for the fabrication of the composite structure. The use of coated yarns allows the use of high performance damage tolerant matrix material and particle toughening technology to produce damage tolerant structures. The fabrication process is compatible with moderate to high volume production rate applications unlike autoclave processes. Tooling for both the partial preform debulking and the debulking to net-shape is relatively inexpensive.

In lieu of using a matrix material that is a priori coated on the structural fibers a resin injection process, such as resin transfer molding, can be used to infiltrate a resin (matrix material) into the preform 26. The process of forming composite primary structures using these types of resins is identical to the process in the above-mentioned first embodiment of the method of the present invention except that during the net-shaped debulking process, the resin is injected into the debulking tool 28 displacing all remaining air within the tool cavity. Depending upon the formulation of the resin, the resin may solidify as the heat is reduced allowing the structure to go through an electron-beam cure in a free standing condition. If the resin remains a liquid at ambient conditions, then the entire tool must be exposed to an electron-beam while the part is cured. In this latter processing technique, the part can not be removed from the debulking tool 28 until it is cured. This latter processing technique is the least efficient of the three techniques described. It is obvious to those having ordinary skill in the art that alternative resin formulations can be developed and applied to this forming process where the resin can be totally or partially cured by heat or UV light prior to final curing with an electron-beam.

According to a second embodiment of the method of the present invention as shown in FIG. 2, a pultrusion fabrication process is employed. The pultrusion fabrication process is similar to conventional pultrusion processes except it depends upon the utilization of a continuous supply of fabric as described in U.S. Pat. No. 5,394,906. Final curing of the structure is performed by electron-beam. As with the continuous press forming fabrication process mentioned above with respect to the first embodiment of the method of the present invention, the process of the second embodiment includes coating structural yarns, which form the fabric 20, with matrix material. As above with respect to the first embodiment, this eliminates the need for infiltrating matrix material into the preform because it is already integral to the fabric. The method then includes feeding multiple layers of fabric 20 together forming an undebulked preform 22.

The undebulked preform 22 is fed into an unheated or heated die 40 (hereinafter referred to as a heated die). The undebulked preform 22 gradually changes dimensions until it has been totally debulked and desired cross-sectional dimensions have been 25 obtained. As the undebulked preform 22 is pulled through the heated die 40, matrix material flows and the preform gradually compresses to the final dimensions of the heated die 40. In FIG. 2, this is shown as an I-beam 42. As the preform traverses the constant cross-sectional portion of the heated die 40, heat is removed and the matrix material solidifies. The length of the constant cross-sectional shape of the heated die 40 is a function of the melting temperature of the matrix material and the pultrusion rate.

Once the structure is pultruded through the heated die 40, it is an uncured structure. However, it no longer requires the use of the heated die 40 to maintain its shape. After a desired length of the structure, for example, a beam 42, has been pultruded, it is cut without interruption of the pultrusion process. The uncured beam 42 which has been cut to length is then input to an electron-beam chamber 32 for curing. The final product is a cured structure 44 having a desired shape and length. Because the preferred embodiment of the present invention employs a method using a continuous net-shaped fabric having optimally tailored fiber orientations and an electron-beam 32 for curing, this results in a superior structure obtained faster and at a lower cost than conventional pultrusion processes.

It should be noted that the final shape of a structure in the pultrusion process can be any desired shape and is not limited to the I-beam shown in FIG. 2, provided the geometry of the cross section is constant along its length. The pultrusion process of the preferred embodiments of the present invention is approximately 10 to 100 times faster than conventional pultrusion processes depending upon matrix material formulation and part geometry.

The foregoing is considered as illustrative only of the principles of the invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention and the appended claims and their equivalents.

That is, the pultrusion process is not restricted to using matrix material (resin) coated fabrics. For example, an alternative pultrusion process draws the fabric through a resin bath prior to the fabric entering an unheated die. A further alternate pultrusion process injects the matrix material into the preform through the die wall. If the resin is not formulated to solidify in the die, then an electron-beam must be integrated into the die to cure the structure as it is being pultruded. If the resin is formulated to solidify in the die, then the process continues as originally described. Resins can be formulated to cure by heat and UV light in combination with electron-beams in a manner similar to the above-described compression forming process. The aforementioned pultrusion process can be readily modified by one of skill in the art to accommodate these as well as other modifications.

What is claimed is:

1. A method for fabricating composite structures having uniform shapes, said method comprising the steps of:

weaving fabric from structural yarns into a net-shaped structure having optimal fiber orientations into a continuous supply of fabric;

feeding multiple layers of fabric to form an undebulked preform;

feeding the undebulked preform into an unheated die;

injecting matrix material into the undebulked preform through the unheated die wall, the matrix material formulated to solidify in the unheated die;

gradually changing dimension of the unheated die to debulk the undebulked preform to net-shape until the desired cross-sectional dimension is obtained;

pulling the debulked preform through the unheated die to uniformly disperse the matrix material into the net-shaped preform;

removing heat from the matrix material allowing it to solidify as the net-shaped infiltrated preform traverses the constant cross-sectional portion of the unheated die and exits the die in an uncured state;

cutting a desired length of the uncured net-shaped infiltrated preform; and curing the uncured net-shaped infiltrated preform.

2. A method according to claim 1, wherein the curing of the uncured net-shaped infiltrated preform includes curing with one of an electron-beam, ultraviolet beam and a combination of any of these.

* * * * *